(12) United States Patent
Moinuddin (10) Patent No.: US 11,983,715 B1
(45) Date of Patent: May 14, 2024

(54) SYSTEMS AND METHODS FOR USING CARDHOLDER PRESENCE ATTRIBUTES FOR SECURE AUTHORIZATION

(71) Applicant: Vantiv, LLC, Symmes Township, OH (US)

(72) Inventor: Moin Moinuddin, Redmond, WA (US)

(73) Assignee: Worldpay, LLC, Symmes Township, OH (US)

( * ) Notice: Subject to any disclaimer, the term of this patent is extended or adjusted under 35 U.S.C. 154(b) by 598 days.

(21) Appl. No.: 15/695,226

(22) Filed: Sep. 5, 2017

(51) Int. Cl.
*G06Q 20/40* (2012.01)
*G06Q 20/20* (2012.01)
*G06Q 20/32* (2012.01)

(52) U.S. Cl.
CPC ....... *G06Q 20/40145* (2013.01); *G06Q 20/20* (2013.01); *G06Q 20/3278* (2013.01); *G06Q 20/4016* (2013.01)

(58) Field of Classification Search
CPC .................................................... G06Q 40/06
USPC ........................................................ 705/44
See application file for complete search history.

(56) References Cited

U.S. PATENT DOCUMENTS

| 2008/0110973 | A1* | 5/2008 | Nathans | G06Q 40/00 235/379 |
| 2016/0162861 | A1* | 6/2016 | Tuscano | G06Q 20/0453 705/21 |
| 2017/0076274 | A1* | 3/2017 | Royyuru | G06Q 20/20 |

* cited by examiner

*Primary Examiner* — Cho Kwong
(74) *Attorney, Agent, or Firm* — Bookoff McAndrews, PLLC (57) ABSTRACT

Systems and methods are disclosed for authenticating electronic payment transactions associated with a merchant. The systems and methods include collecting and storing user validation credentials associated with a consumer and a payment vehicle. When completing a payment transaction, a fraud detection engine compares payment transaction data against the stored user validation credentials for payment authorization.

14 Claims, 7 Drawing Sheets

SYSTEMS AND METHODS FOR USING CARDHOLDER PRESENCE ATTRIBUTES FOR SECURE AUTHORIZATION

TECHNICAL FIELD

The present disclosure relates generally to the field of payment transactions and, more particularly, to the authentication of cardholder-present (CHP) transactions.

BACKGROUND

Consumers are increasingly using their mobile devices to purchase goods and services. With credit card information stored in mobile devices, consumers can generally make purchases without presenting their credit cards. A consumer may, for example, visit a brick-and-mortar store and use their mobile device at a point-of sale (POS) terminal to make a purchase. A consumer may also pay for goods and services through merchant's applications installed on mobile devices. Credit card information stored on the consumer's mobile device is transferred directly to the merchant's application. In these instances, the consumer may be present, but because purchases can be made without the presence of credit cards, there is an increased risk of payment-card fraud to merchants. Card-not-present (CNP) transactions therefore come at a higher cost to merchants than card-present (CP) transactions. Cardholder present (CHP) transactions should come at a lower cost to merchants than CNP transactions (as is recommended to payment card networks, such as, e.g., Visa and Mastercard). There is, therefore, a need to verify that purchases made via mobile devices are indeed made by the cardholder.

SUMMARY

A computer-implemented method is disclosed for authenticating electronic payment transactions associated with a merchant. The method comprises collecting user validation credentials associated with a consumer and a payment vehicle; storing the user validation credentials; initiating a check-out procedure for the consumer to complete a payment transaction at a point-of-sale (POS) terminal associated with the merchant; prompting the consumer to present the payment vehicle and interact with the POS terminal for completing the payment transaction; receiving an indication that the payment vehicle interacted with the POS terminal; receiving customer data from the payment vehicle; prompting the consumer to approve the release of payment transaction data associated with the payment transaction, wherein when the consumer approves the release of payment transaction data associated with the payment transaction, collecting the payment transaction data, authenticating the payment transaction data against the stored user validation credentials, processing the payment transaction with the received customer data, and displaying a result of the payment transaction to the consumer, and wherein when the consumer does not approve the release of payment transaction data associated with the payment transaction, denying the payment transaction, and displaying the result of the payment transaction to the consumer; and completing the check-out procedure for the consumer to complete the payment transaction.

A system is disclosed for authenticating electronic payment transactions associated with a merchant, the system comprising: a data storage device storing instructions for managing electronic payment transactions at a merchant location; and a processor configured to execute the instructions to perform a method including the steps of: collecting user validation credentials associated with a consumer and a payment vehicle; storing the user validation credentials; initiating a check-out procedure for the consumer to complete a payment transaction at a point-of-sale (POS) terminal associated with the merchant; prompting the consumer to present the payment vehicle and interact with the POS terminal for completing the payment transaction; receiving an indication that the payment vehicle interacted with the POS terminal; receiving customer data from the payment vehicle; prompting the consumer to approve the release of payment transaction data associated with the payment transaction, wherein when the consumer approves the release of payment transaction data associated with the payment transaction, collecting the payment transaction data, authenticating the payment transaction data against the stored user validation credentials, processing the payment transaction with the received customer data, and displaying a result of the payment transaction to the consumer, and wherein when the consumer does not approve the release of payment transaction data associated with the payment transaction, denying the payment transaction, and displaying the result of the payment transaction to the consumer; and completing the check-out procedure for the consumer to complete the payment transaction.

A non-transitory computer readable medium is disclosed for use on at least one computer system containing computer-executable programming instructions for authenticating electronic payment transactions associated with a merchant, the method comprising: collecting user validation credentials associated with a consumer and a payment vehicle; storing the user validation credentials; initiating a check-out procedure for the consumer to complete a payment transaction at a point-of-sale (POS) terminal associated with the merchant; prompting the consumer to present the payment vehicle and interact with the POS terminal for completing the payment transaction; receiving an indication that the payment vehicle interacted with the POS terminal; receiving customer data from the payment vehicle; prompting the consumer to approve the release of payment transaction data associated with the payment transaction, wherein when the consumer approves the release of payment transaction data associated with the payment transaction, collecting the payment transaction data, authenticating the payment transaction data against the stored user validation credentials, processing the payment transaction with the received customer data, and displaying a result of the payment transaction to the consumer, and wherein when the consumer does not approve the release of payment transaction data associated with the payment transaction, denying the payment transaction, and displaying the result of the payment transaction to the consumer; and completing the check-out procedure for the consumer to complete the payment transaction.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Various non-limiting embodiments of the present disclosure will now be described to provide an overall understanding of the principles of the structure, function, and use of systems and methods disclosed herein related to the secure authorization of electronic payment transactions using cardholder presence attributes. One or more examples of these non-limiting embodiments are illustrated in the selected examples disclosed and described in detail with reference made to FIGS. 1A through 5 in the accompanying drawings. Those of ordinary skill in the art will understand that systems, apparatuses, devices, and methods specifically described herein and illustrated in the accompanying drawings are non-limiting embodiments. The features illustrated or described in connection with one non-limiting embodiment may be combined with the features of other non-limiting environments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these apparatuses, devices, systems or methods unless specifically designated as mandatory. For ease of reading and clarity, certain components, modules, or methods may be described solely in connection with a specific figure. In this disclosure, any identification of specific techniques, arrangements, etc. either are related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment," or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack.

As described above, consumers are increasingly using their mobile devices to purchase goods and services. The payment transactions may occur at brick-and-mortar locations associated with a merchant, or they may occur on-the-go with merchant applications installed on consumer's mobile devices. In either case, a consumer's payment card may not be present (CNP), but the payment card information may be stored on a consumer's mobile device. CNP transactions generally may carry an increased risk of fraud to merchants (and thus at an increased cost) than with card-present (CP) payment transactions. However, the risk of fraud may be reduced if merchants can verify the presence of the cardholder (CHP) associated with the stored payment card information. There is therefore a need for verifying a cardholder's presence when a mobile device (with stored payment card information) is used for payment transactions.

For simplicity, the description that follows will be provided by reference to a "payment vehicle" or a "payment card," which generally refers to any type of financial alternative to currency. As is to be clear to those skilled in the art, no aspect of the present disclosure is specifically limited to a specific type of payment vehicle or payment card. Therefore, it is intended that the following description encompasses the use of the present disclosure with many other forms of financial alternatives to currency, including credit cards, debit cards, smart cards, single-use cards, prepaid cards, electronic currency (such as might be provided through a cellular telephone or personal digital assistant), and the like. Payment vehicles or payment cards can be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, prepaid or stored-value cards, electronic benefit transfer cards, or any other like financial transaction instrument.

Point-of-sale ("POS") systems used by merchants generally accept payments from consumers in the form of cash, check, credit cards and so forth. POS systems can include one or more POS terminals and can include back-office computing systems. POS systems and POS terminals can be specialized computing devices configured to send and receive financial transaction data, for example between a POS system and a POS terminal, or with a payment network provider such as an acquirer processor. Acquirer processors similarly can use specialized computing devices configured to send, receive, and process financial transaction data.

Figure 1A:
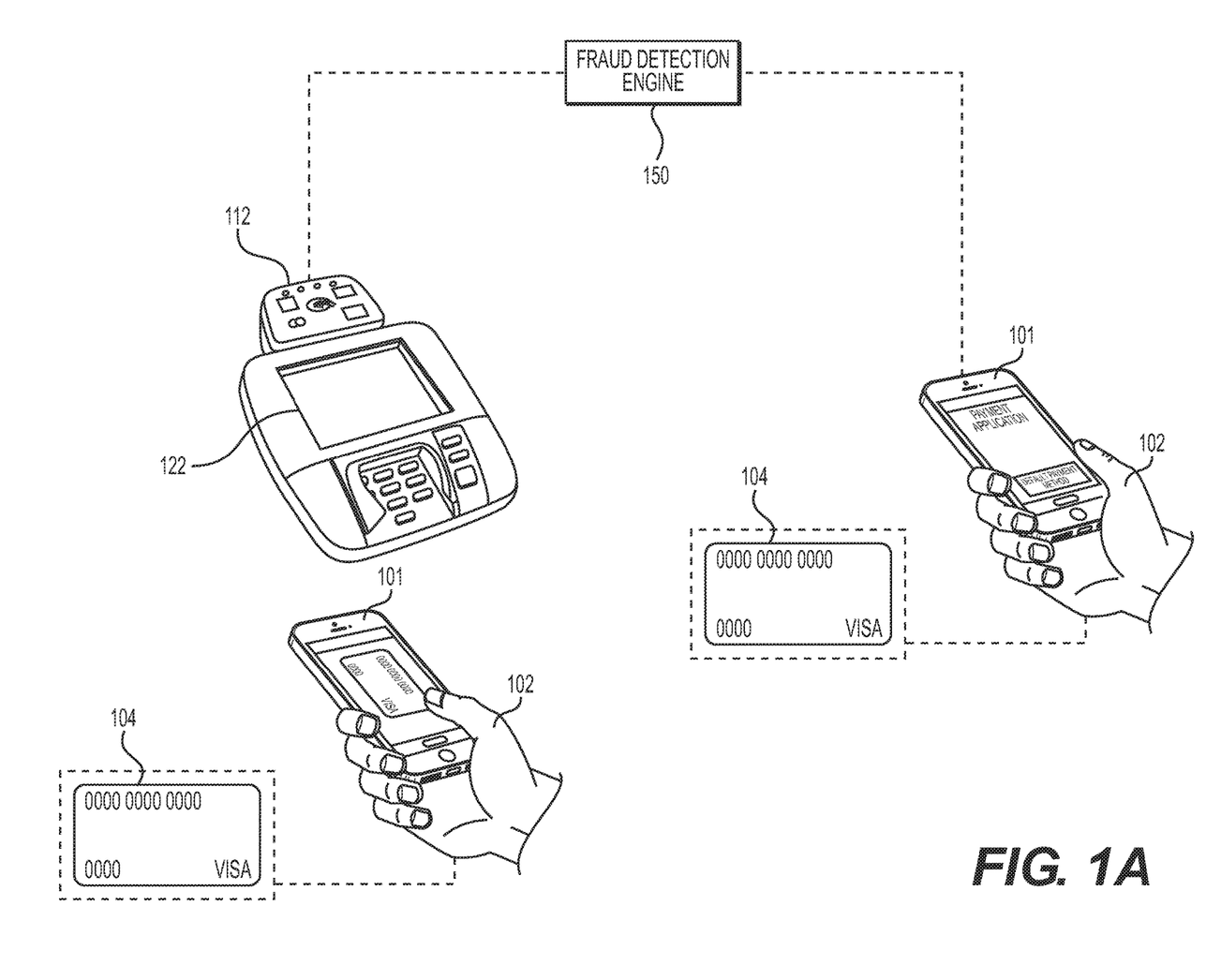
FIG. 1A depicts scenarios in which mobile devices are used to make purchases, according to one or more embodiments.

FIG. 1A depicts scenarios in which a payment vehicle 101 (e.g., mobile device with stored credit card information) is used to purchase goods and/or services. For example, a consumer 102 may use payment vehicle 101 at a POS terminal 112 to make purchases. In some embodiments, near-field communication (NFC) may enable the wireless transfer of credit card information 104 between payment vehicle 101 and POS terminal 112. In another example, consumer 102 may use payment vehicle 101 to make purchases through a merchant application installed on the mobile device. In some embodiments, credit card information 104 is transferred directly between payment vehicle 101 and the installed merchant application. In either of these scenarios, a fraud detection engine 150 may provide secure authorization for purchases by authenticating a consumer's presence attributes against the consumer's validation credentials. Fraud detection engine 150 may be associated with a payment card and its respective financial institution. The presence attributes may include details that verify the presence of the cardholder, such as e.g., the location details of the purchase transaction. The consumer's validation credentials may include details relating to a cardholder's mobile device, such as e.g., phone number, mobile device make, mobile device model, mobile device type, MIC code, etc. In other embodiments, the consumer's validation credentials may include personal details and/or preferences, such as e.g., biometric information, security questions and answers, locations details of home and work, frequent travel destinations, favorite dining establishments, favorite department stores, etc. The consumer's validation credentials may be provided manually during an initial registration period, or by authorizing the respective financial institution to pull the information automatically from the consumer's mobile device.

Figure 1B:
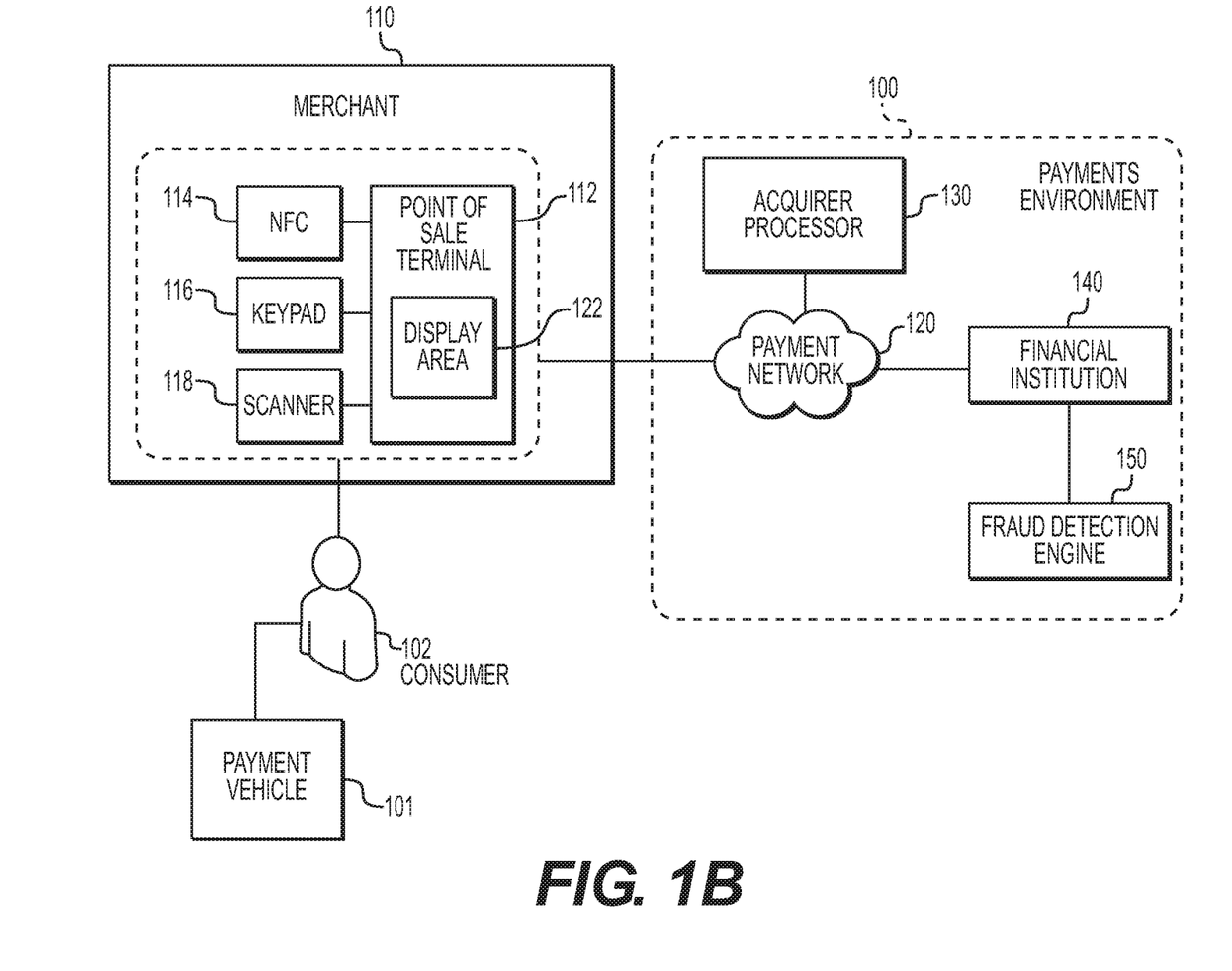
FIG. 1B depicts a merchant environment for processing consumer payment transactions, according to one or more embodiments.

FIG. 1B depicts a payments processing network generally comprising a merchant 110, acquirer processor 130, financial institution 140, and consumer 102, all provided in communication with each other via a payment network 120. The components of the payments processing network may be connected by any combination of wired or wireless networks, for example, PSTNs and/or the Internet. Acquirer processor 130 (e.g., acquiring bank) is in partnership with payment network 120, such that the acquirer processor 130 may process payments through, and on behalf of, payment network 120. Payment network 120 may in turn have a partnership with financial institution 140 (e.g., issuing bank). Financial institution 140 may hold accounts for one or more of consumers 102. Each consumer 102 may have a payment vehicle 101 (e.g., credit card, debit card, stored value card, etc.) which may be affiliated with payment network 120. Consumer 102 may be able to use their payment vehicle 101 for purchases from merchant 110.

Acquirer processor 130 may be an entity that provides a variety of electronic payment processing services to merchant 110. For example, acquirer processor 130 may be an entity that receives payment information from a transaction that occurs at a POS terminal 112 at merchant 110. The payment information may be, for example, payment card information encoded in the magnetic stripe or EMV chip of payment vehicle 101 and a payment amount of a transaction being made by, for example, consumer 102 with merchant 110 using the payment card account associated with payment vehicle 101. Acquirer processor 130 may process the information, and may send the information to the consumer's respective financial institution 140 via an appropriate payment network 120 depending on the particulars of payment vehicle 101. Processing the information may include, for example, determining the identity of payment network 120 and financial institution 140 associated with the particular payment vehicle 101.

Acquirer processor 130 may also receive information from payment network 120 such as confirmation or rejection of an attempted transaction using payment vehicle 101 and may convey that information to the appropriate POS terminal. Moreover, acquirer processor 130 may provide security and/or encryption services to merchant 110 and payment network 120; such that payments processed at POS terminal 112 may be completed with a decreased risk of data or financial theft or loss. Acquirer processor 130 may be located, for example, remotely from merchant 110 that uses its services, and may, for example, interact with merchant 110 primarily over an electronic network, such as a data network or the Internet.

Payment network 120 may be, for example, a network that relays debit and/or credit transactions to and from various accounts at financial institution 140. For example, payment network 120 may have a partnership program with financial institution 140 through which financial institution 140 may provide a payment vehicle account to consumer 102 associated with payment network 120. Payment network 120 may also be partnered with acquirer processor 130 which may manage payment transactions associated with payment network 120. Examples of payment network brands include, e.g., Visa, MasterCard, Discover, and American Express. While a single payment network 120 is illustrated, it is to be appreciated that multiple payment networks may be partnered with a single or multiple acquirer processors.

Financial institution 140 may be a bank that manages payment accounts associated with one or more of payment network 120 on behalf of one or more of consumer 102. For example, financial institution 140 may allow for consumer 102 to build up a revolving credit balance at financial institution 140 and may periodically receive payments from consumer 102 to pay down the balance. Consumer 102 may be an individual, a company, or other entity having accounts with one or more of financial institution 140. Each consumer 102 may generally have at least one payment vehicle 101 associated with each payment account held by that consumer. Each consumer 102 may have multiple accounts with multiple financial institutions 140 which may be affiliated with the same or different payment network 120. In some embodiments, financial institution 140 may be associated with a fraud detection engine 150. Fraud detection engine 150 may be configured to collect and store consumer validation credentials, including details relating to a consumer's mobile device, such as e.g., phone number, mobile device make, mobile device model, mobile device type, MIC code, etc. In other embodiments, the consumer's validation credentials may include personal details and/or preferences relating to the consumer, such as e.g., biometric information, security questions and answers, locations details of home and work, frequent travel destinations, frequent dining establishments, frequent shopping destinations, etc. The consumer's validation credentials may be provided manually or by authorizing the respective financial institution to pull the information automatically from the consumer's mobile device. The consumer's validation credentials may be provided during an initial registration period or any time during subsequent payment transactions. The consumer's validation credentials may be stored on any suitable storage device associated with financial institution 140 or fraud detection engine 150.

Merchant 110 may be a merchant offering goods and/or services for sale to consumer 102 who have contracted with acquirer processor 130. Merchant 110 may be equipped with POS terminal 112, which is configured to receive payment information from payment vehicle 101 and to relay received payment information to acquirer processor 130. Merchant 110 can be any type of merchant, such as a brick-and-mortar retail location or an e-commerce/web-based merchant with a POS terminal 112.

New payment modalities for purchasing goods and services enable consumer 102 to pay using forms of payment other than cash, check, or payment card. For example, online vendors accept payments via third-party payment providers, but can be termed third-party payment processors. Example third-party payment providers include, but are not limited to ApplePay™, Android Pay™, PayPal™, and Samsung Pay™ among other suitable third-party payment providers. Consumers 102 can pay for goods and services using their mobile computing device, such as an iPhone™ from Apple™, or an Android™ based smartphone. These new payment types can be beneficial to consumer 102 and merchant 110 alike. Consumer 102 can benefit from the convenience of using mobile payment systems. Merchant 110 can benefit from more economical transaction costs offered by third-party payment providers. Many third-party payment providers use digital wallets. Digital wallets provide flexibility to consumer 102, allowing consumer 102 to choose their preferred form of payment from one or more accounts configured in their digital wallet. For example, for any transaction, consumer 102 can choose whether to pay from a payment card, bank account, or line of credit in their digital wallet. Digital wallets also provide security to consumer 102 because the consumer's payment card and bank account numbers are not provided to a merchant 110 during checkout.

In FIG. 1B, consumer 102 is shown to be associated with a payment vehicle 101. As is to be appreciated, payment vehicle 101 can include any type of payment vehicle that can be utilized to initiate a payment transaction. Unless otherwise specified herein, "payment vehicle" includes a virtual card, such as a display or screenshot for a mobile phone or for another portable device (e.g., a flash drive, smart chip, a laptop or portable computer), or for a computer device (e.g., a desktop computer) in combination with data indicative of an account number or other account indicative information. Data associated with the cards may include an encrypted or unencrypted account number or other encrypted or unencrypted account indicative information and/or encrypted or unencrypted information associated with a particular card, issuer, creator, or group of merchants. It is also contemplated that the card may have multiple embodiments or forms. For example, the card may be a physical card (e.g., in the form of magnetic striped plastic card), a virtual card (e.g., in the form of a display on a smart phone), or both. In embodiments in which the card is a virtual card, the corresponding account information (e.g., account number) would initially be provided to the consumer and the consumer would communicate the account information to the merchant. The virtual card may be communicated by displaying a display or screenshot, and/or by transmitting a signal, such as by using a near field communication (NFC) technology, or other secure transport technologies to complete the transaction with the selected merchant. NFC is a short range, high frequency, wireless communication technology that enables the exchange of data between devices over a relatively short distance. Optionally, the virtual card may have a display element (e.g., a barcode or string of numbers) which identifies the account number associated with the card. Alternatively, the virtual card may have display elements relating to the merchants which accept the card. Thus, whether the card is physical or virtual, it communicates account information.

A POS terminal 112 of merchant 110 provides transaction information to the payment network 120 using conventional payment transaction communications. When consumer 102 checks-out, or pays for the goods or services, the identifying indicia of consumer 102 can be used for authentication. In one configuration, the POS terminal 112 can include an NFC system 114. NFC system 114 can communicate wirelessly with payment vehicle 101 of consumer 102, for example to obtain an authorization code or identifying information of consumer 102 or of payment vehicle 101. In another configuration, POS terminal 112 can include a keypad 116. Consumer 102 can enter a personal identification number on keypad 116 for making a payment. Other numbers or alphanumeric characters, such as temporary passwords or authorization codes, are also contemplated as would be understood by one of ordinary skill in the art. In another configuration, POS terminal 112 can include a scanner 118. Consumer 102 can display a code, such as a barcode or quick response (QR) code on the display of their mobile computing device to provide identifying indicia of consumer 102. Scanner 118 can be a handheld scanner, an embedded scanner such as is used to scan items at grocery stores, a camera, and so forth as would be understood by one of ordinary skill in the art.

POS terminal 112 can include a display area 122. In various embodiments the display area 122 can be a window, a widget, or a pop-up, a webpage, and so forth, and be rectangular or nonrectangular, and occupy one or multiple contiguous or non-contiguous areas of POS terminal 112.

POS terminal 112 can generate a payment request for payment by merchant 110. The payment request can include information such as information identifying the merchant to acquirer processor 130 or the party of payment network 120, the payment amount, which can include a gratuity, identifying indicia for consumer 102, authentication information such as whether the consumer was authenticated by merchant 110 using images of consumer 102, and/or authentication information such as personal identification number entered on keypad 116 by the consumer, a code scanned by scanner 118, or information about consumer 102 or payment vehicle received via NFC handshake or any other suitable authentication information.

The payment request can be packaged into a data structure and sent to the acquirer processor 130 or other transaction processing entity in the payment network 120 for processing. Suitable data structures can include, but are not limited to, proprietary data structures, or data structures to find a suitable notation such as Abstract Syntax Notation One (ASN.1) or Java Script Object Notation (JSON), or any other suitable encoding formats or data structure as would be understood by one of ordinary skill in the art. In various embodiments, a mobile wallet service can be used or a third party payment provider's digital wallet can be accessed. Consumer 102 can configure the digital wallet to use the desired bank account, payment card, or line of credit to be used in processing the transaction. Acquirer processor 130 can process the transaction with financial institution 140, and POS terminal 112 can receive confirmation of a successful transaction from payment network 120. If not successful, POS terminal 112 can receive information indicating why payment was not able to be made through financial institution 140. The transaction result can be displayed to consumer 102 via any suitable method, including via display area 122 of POS terminal 112.

Figure 2A:
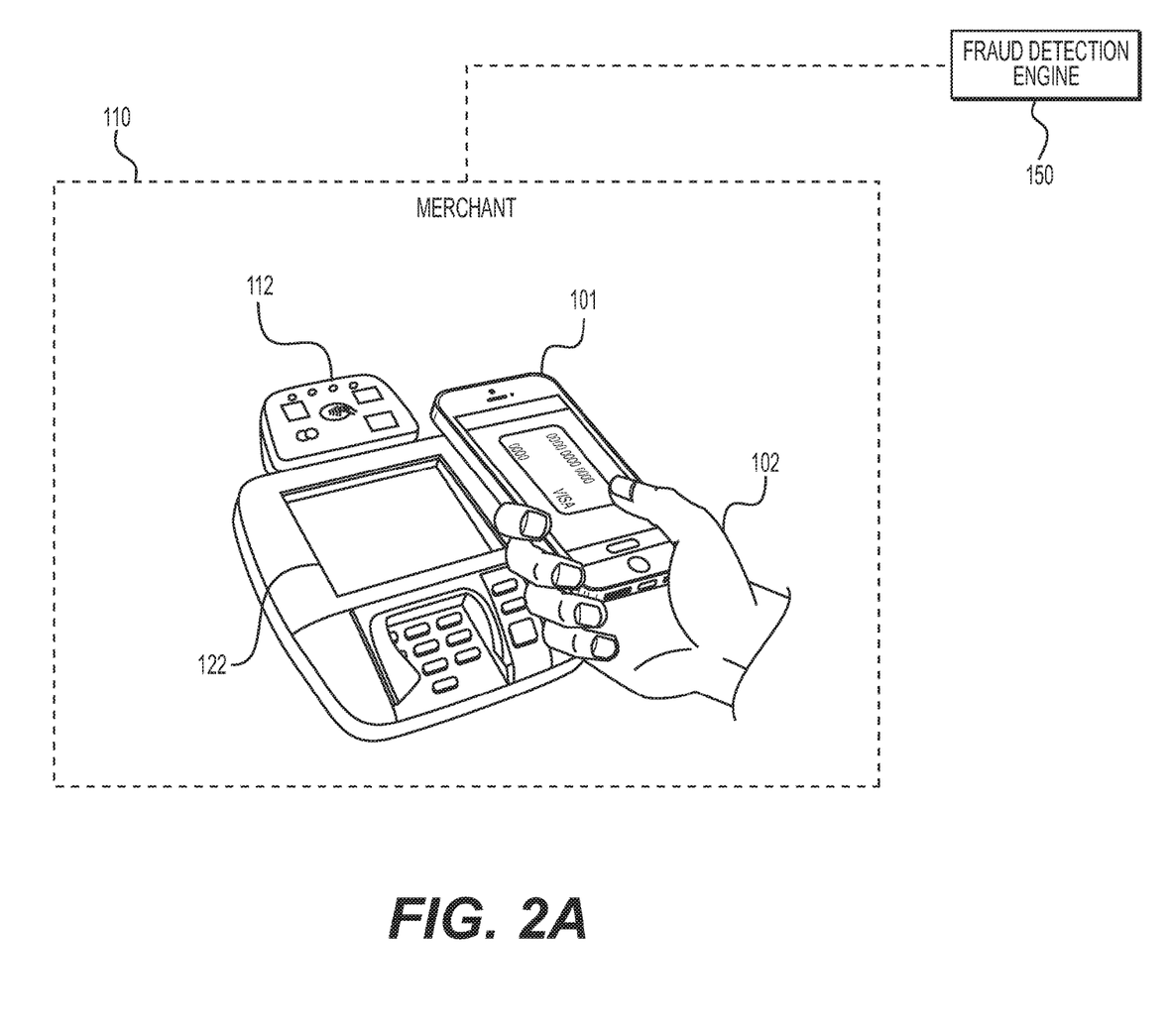
FIG. 2A depicts an NFC-enabled payment vehicle interacting with an NFC device at a merchant location, according to one or more embodiments.
Figure 2B:
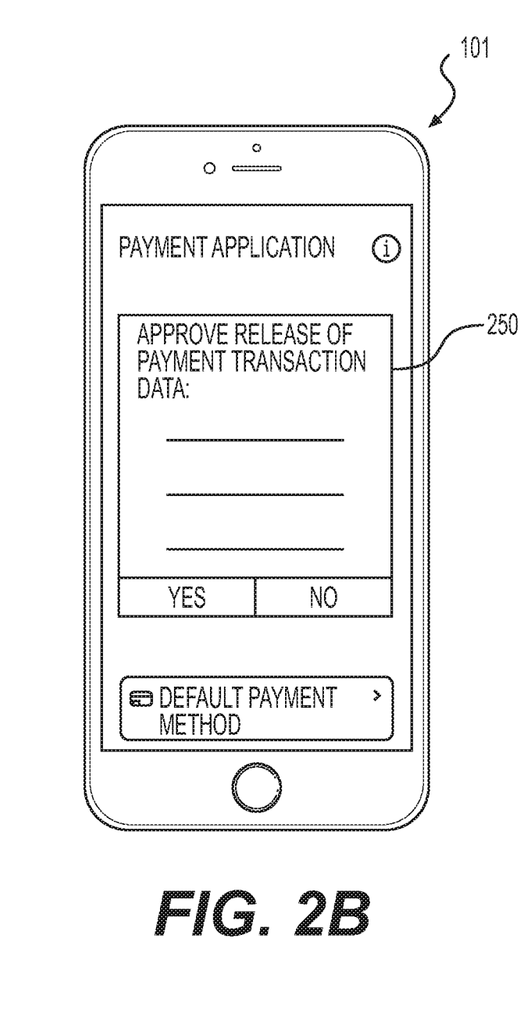
FIG. 2B depicts an illustrative display of an NFC-enabled payment vehicle with a consumer prompt, according to one or more embodiments.

FIGS. 2A-2B illustrate embodiments of an example system and method for facilitating a check-out procedure at a merchant 110 location. FIG. 2A depicts an interaction between an NFC-enabled payment vehicle 101 and an NFC device 112 for facilitating a payment transaction during a check-out procedure. In some embodiments, NFC device 112 includes a display 122 for displaying or prompting messages to consumer 102. During a check-out procedure, the consumer is prompted to "tap" the NFC-enabled payment vehicle 101 for initiating a payment transaction. The term "tap" can be any kind of motion (e.g., waving or holding in close proximity) in which the NFC device 112 registers interaction (e.g., handshake) with the NFC-enabled payment vehicle 101. After initiating the payment transaction, fraud detection engine 150 and payments environment 100 proceeds to determine whether the payment transaction is successful. In some embodiments, fraud detection engine 150 pulls data from the consumer's mobile device and verifies it against the expected cardholder's mobile device data, such as e.g., phone number, make, model, and MIC number. If fraud detection engine 150 determines that any of the pulled mobile device data does not match the mobile device data associated with the payment card, payment network 120 may initially deny the payment transaction.

Figure 2C:
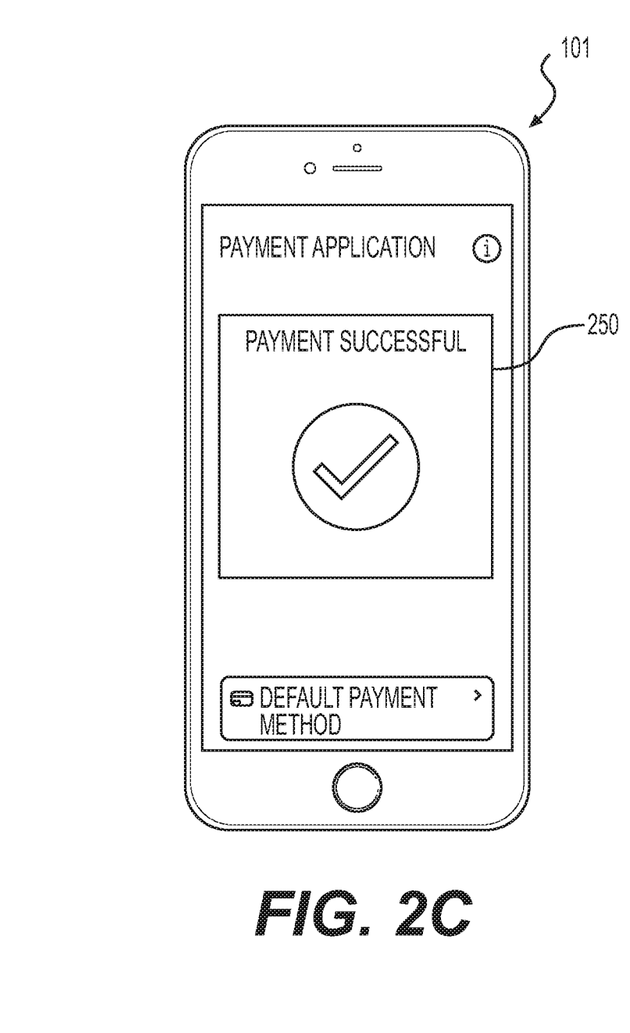
FIG. 2C depicts an illustrative display of an NFC-enabled payment vehicle after a successful payment transaction, according to one or more embodiments.

In other embodiments, fraud detection engine 150 may prompt for additional cardholder-presence (CHP) attributes to provide secure authorization for the payment transaction. FIG. 2B depicts an illustrative display of prompt 250 requesting consumer 102 to approve release of additional payment transaction data. In some embodiments, the payment transaction data may include, for example, the brick-and-mortar store address associated with merchant 110. In other embodiments, the payment transaction data may include other merchant 110 details and/or consumer 102 presence details, such as e.g., a restaurant address, a hotel address, department store address, etc. Upon approval by consumer 102, fraud detection engine 150 collects the payment transaction data and cross-checks it against the stored consumer validation credentials. For example, the merchant address may match against a consumer's favorite dining establishment listed in the consumer's validation credentials. In another example, the merchant address may match against a favorite department store listed in the consumer's validation credentials. If fraud detection engine 150 determines that the payment transaction data does not match any of the information provided in the consumer validation credentials, payment network 120 may deny the payment transaction. If, however, fraud detection engine 150 determines the payment transaction data matches the information provided in the consumer's validation credentials, then payment network 120 may approve the payment transaction. FIG. 2C depicts an illustrative display of payment vehicle 101 with prompt 250 indicating a successful purchase transaction.

Figure 3A:
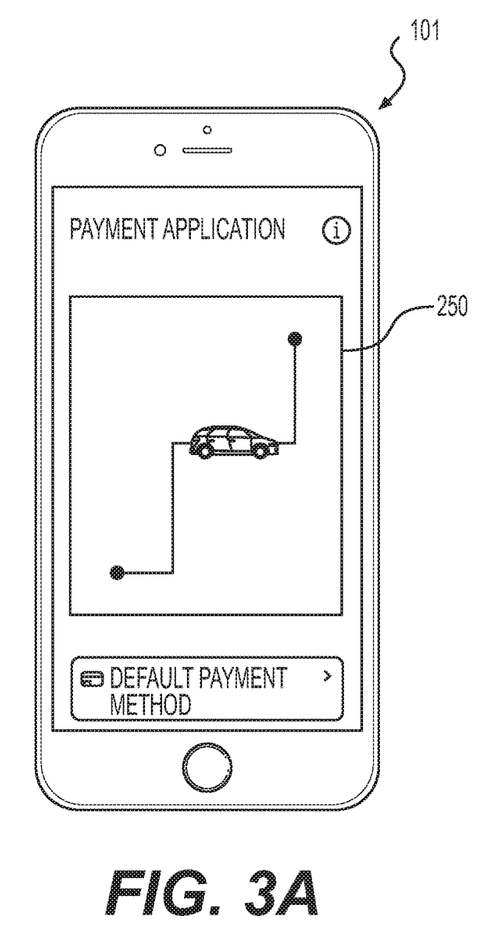
FIG. 3A depicts an illustrative display of a merchant application running on a consumer's payment vehicle, according to one or more embodiments.
Figure 3B:
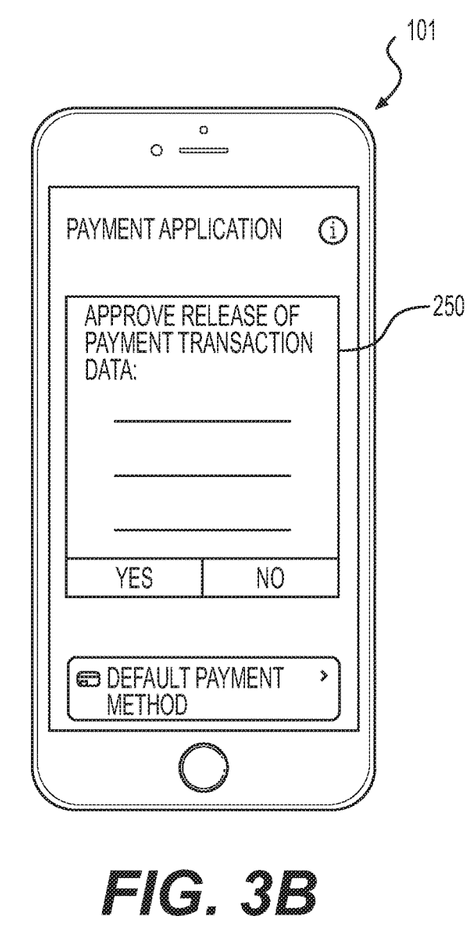
FIG. 3B depicts an illustrative display of a payment vehicle with a consumer prompt, according to one or more embodiments.

FIGS. 3A-3B illustrate embodiments of an example system and method for facilitating a check-out procedure within a merchant application running on a consumer's mobile device 101. FIG. 3A depicts one example of a merchant application running on a consumer's mobile device 101. Prompt 250 may indicate, for example, that consumer 102 is completing a ride-sharing service and is ready to process a payment transaction. After initiating the payment transaction, fraud detection engine 150 and payments environment 100 proceeds to determine whether the payment transaction is successful. In some embodiments, fraud detection engine 150 pulls data from the consumer's mobile device and verifies it against the expected cardholder's mobile device data, such as e.g., phone number, mobile device make, mobile device model, mobile device type, MIC code, etc. If fraud detection engine 150 determines that any of the pulled mobile device data does not match the mobile device data associated with the payment card, payment network 120 may initially deny the payment transaction.

Figure 3C:
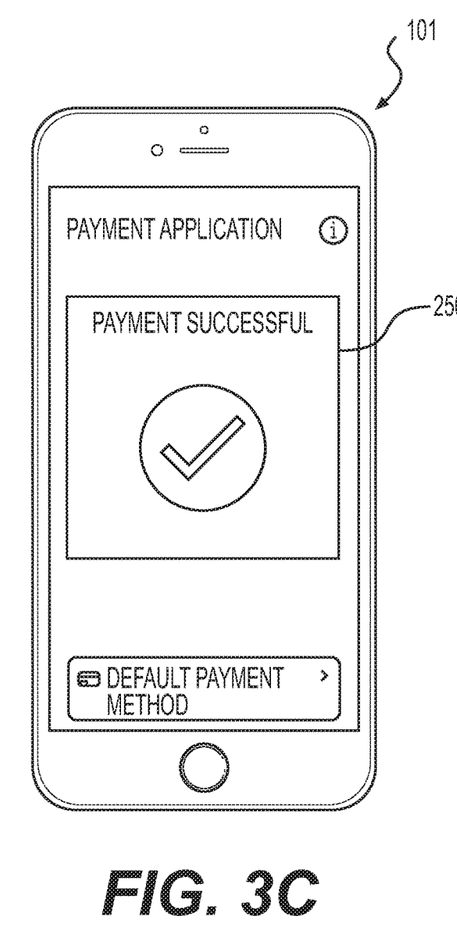
FIG. 3C depicts an illustrative display of a payment vehicle after a successful payment transaction, according to one or more embodiments.

In other embodiments, fraud detection engine 150 may prompt for additional cardholder-presence (CHP) attributes to provide secure authorization for the payment transaction. FIG. 3B depicts an illustrative display of prompt 250 requesting consumer 102 to approve release of additional payment transaction data. In some embodiments, the payment transaction data may include, for example, the pick-up and/or drop-off address associated with consumer's use of the car-sharing service. Upon approval by consumer 102, fraud detection engine 150 collects the payment transaction data (e.g., by global positioning system (GPS) data indicating location of the mobile device, or by address information entered by the consumer) and cross-checks it against the stored consumer validation credentials. For example, the pick-up and/or drop-off address may be cross-checked against a consumer's home and/or work address listed in the consumer's validation credentials. In other embodiments, the payment transaction data may include other address information listed in the consumer's validation credentials (e.g., the address of anyone listed in the consumer's contact list, or the address of favorite and/or regularly-visited locations, such as, e.g., grocery stores, department stores, restaurants, hotels, transit stations, airports, etc.). While FIG. 3B illustrates a merchant's application relating to car-sharing service, it is to be appreciated that other forms of merchant applications are contemplated. For example, the payment transaction data may include a shipping address for a product intending to be purchased through an online merchant 110. The shipping address for the intended purchase may be cross-checked against the consumer's home mailing address (or the mailing address of anyone listed in the consumer's contact list). If fraud detection engine 150 determines that the payment transaction data does not match any of the information provided in the consumer validation credentials, payment network 120 may deny the payment transaction. If, however, fraud detection engine 150 determines the payment transaction data matches the information provided in the consumer's validation credentials, then payment network 120 may approve the payment transaction. FIG. 3C depicts an illustrative display of payment vehicle 101 with prompt 250 indicating a successful purchase transaction.

Figure 4:
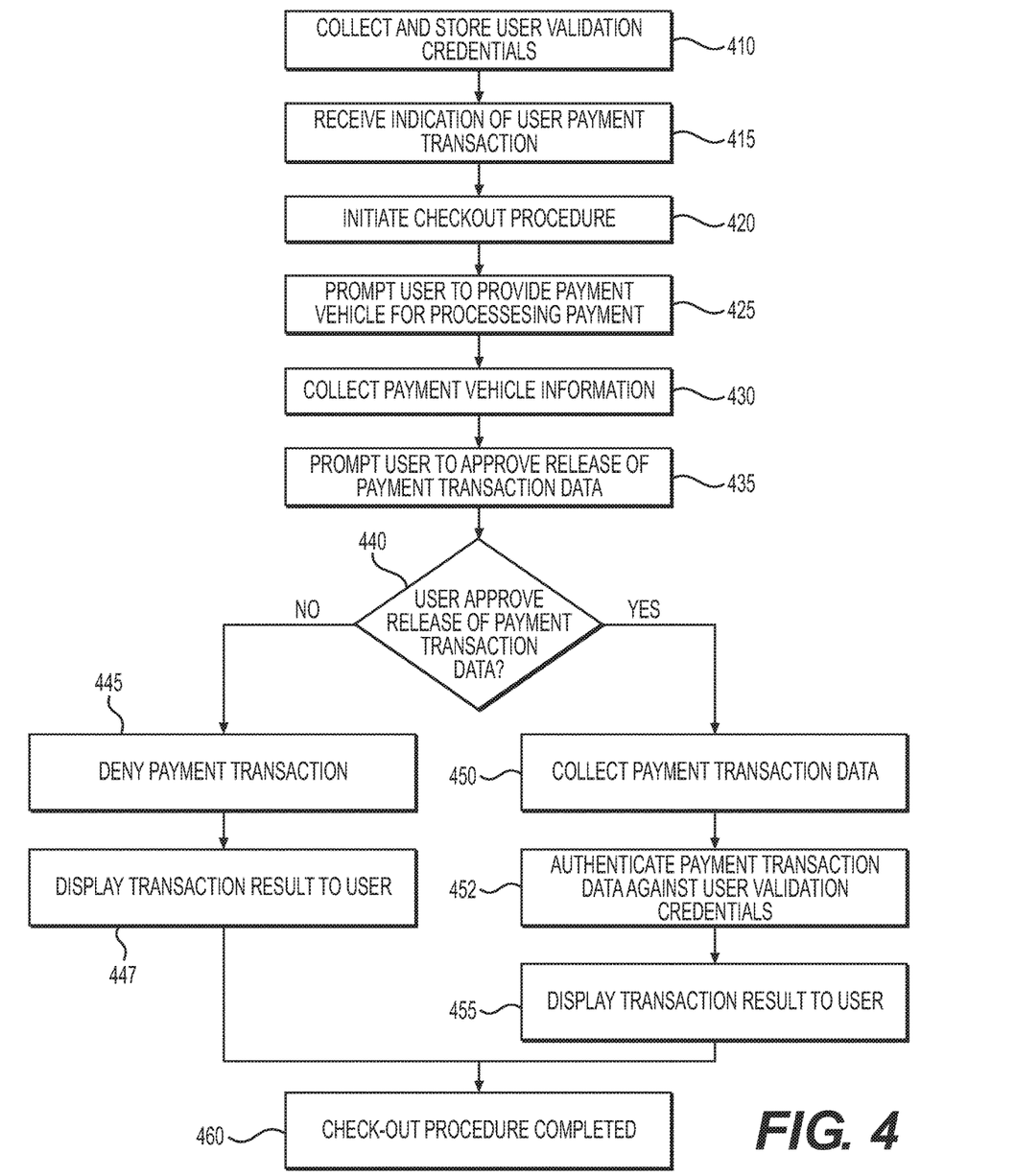
FIG. 4 is a flow chart of an example process for authenticating payment transaction data against user validation credentials, according to one or more embodiments.

FIG. 4 is a flow chart depicting an example process 400 for authenticating payment transaction data against user validation credentials. In step 410, financial institution 140 collects and stores user validation credentials. In some embodiments, the user validation credentials may include authentication information, such as e.g., mobile device phone number, mobile device MIC code, mobile device type, mobile device model, etc. In other embodiments, the authentication information may include consumer 102 information, such as e.g., bio-metric information, security questions and answers, location details of home and work, frequent travel destinations, favorite dining locations, favorite department stores, etc. The user validation credentials may be collected during a one-time registration (or sign-up) period when associating the payment vehicle with consumer 102. In step 415, merchant 110 receives an indication that consumer 102 is initiating a payment transaction via payment vehicle 101. In some embodiments, the payment transaction may be initiated at a POS terminal 112 associated with merchant 110 at a brick-and-mortar location, or may be initiated at a POS terminal 112 associated with a merchant application installed on a consumer's mobile device. In step 420, POS terminal 112 initiates a check-out procedure to complete the payment transaction. In step 425, consumer 102 is prompted to provide payment vehicle 101 for processing the payment transaction. In step 430, POS terminal 112 collects and transmits the payment vehicle information to payment network 120. In step 435, payment network 120 receives the payment vehicle information and prompts user to approve release of payment transaction data. In some embodiments, the payment transaction data may include the brick-and-mortar location associated with the purchase event. In other embodiments, the payment transaction data may include the location of the mobile device associated with consumer 102. In yet other embodiments, the payment transaction data may include a shipping address specified for the purchase event.

In step 440, it is determined whether consumer 102 approves the release of the payment transaction data. If it is determined that consumer 102 approves the release of the payment transaction data, the method proceeds to step 450. In step 450, payment network 120 collects and transmits the payment transaction data to financial institution 140. In some embodiments, the payment transaction data may include, for example, the brick-and-mortar store address associated with merchant 110. In other embodiments, the payment transaction data may include other merchant 110 details and/or consumer 102 presence details, such as e.g., a restaurant address, a hotel address, department store address, etc. In other embodiments, the payment transaction data may include other location data, such as, e.g., global positioning system (GPS) data indicating location of the mobile device, and/or address information entered by the consumer, such as, e.g., a shipping address for an intended online purchase. Payment network 120 can generally process payment transactions either online or offline. In some embodiments, offline approvals may be processed at POS terminal 112 before sending the transaction information to payment network 120 (e.g., delayed processing). In other embodiments, an offline transaction may be processed at POS terminal 112 and declined without sending the transaction information to payment network 120. In step 452, financial institution 140 processes the payment transaction data with fraud detection engine 150. Fraud detection engine 150 authenticates the payment transaction data against the stored user validation credentials. In step 455, POS terminal 112 receives the result of the payment transaction and displays the result. The result of the payment transaction can be displayed on display area 122 of POS terminal 112 or on prompt 250 of payment vehicle 101. In step 460, the check-out procedure is completed.

In step 440, if it is determined that consumer 102 does not approve the release of the payment transaction data, then the method proceeds to step 445. In step 445, payment network 120 denies the payment transaction. In step 447, POS terminal 112 receives the result of the payment transaction and displays the result. The result of the payment transaction can be displayed on display area 122 of POS terminal 112 or on prompt 250 of payment vehicle 101. In step 460, the check-out procedure is completed.

Figure 5:
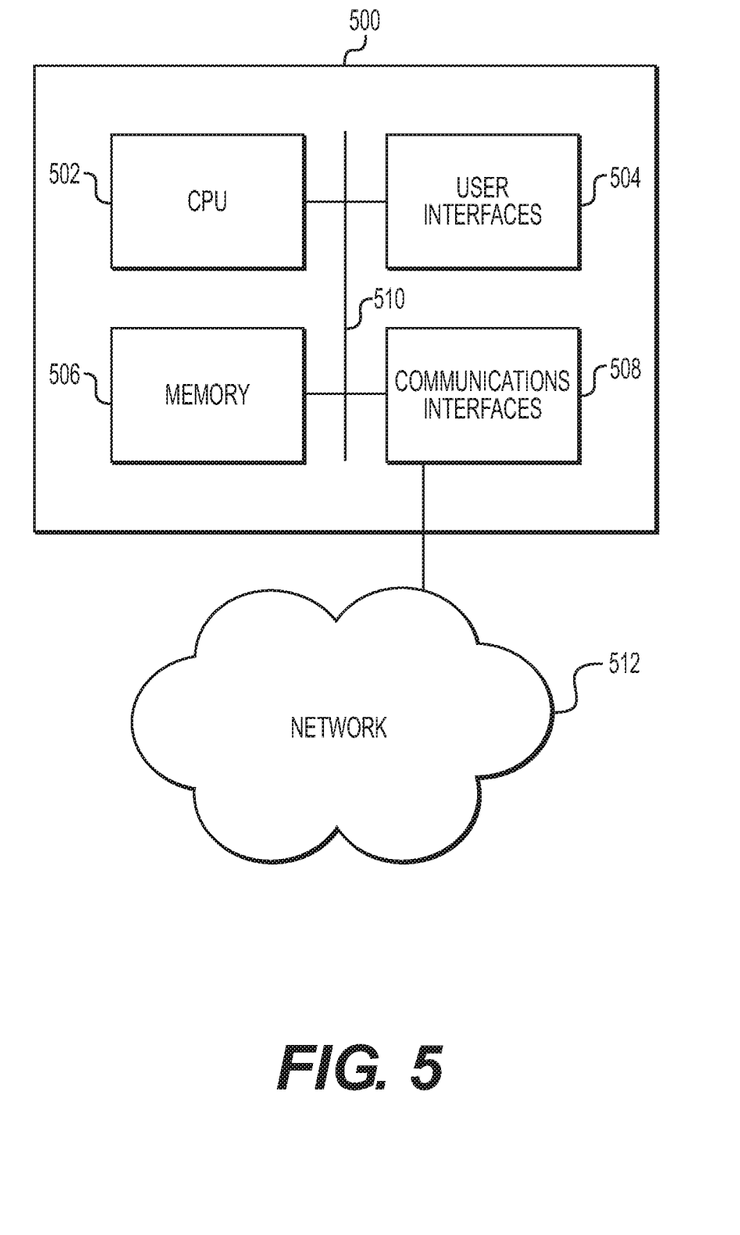
FIG. 5 is a block diagram of an example computing environment, according to one or more embodiments.

The systems and processes described above can be performed on or between one or more computing devices. FIG. 5 illustrates an example computing device. A computing device 500 can be a server, a computing device that is integrated with other systems or subsystems, a mobile computing device such as a smart phone, a cloud-based computing ability, and so forth. The computing device 500 can be any suitable computing device as would be understood in the art, including without limitation, a custom chip, and embedded processing device, a tablet computing device, a POS terminal 112 associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component can be replaced by multiple components and multiple components can be replaced by single component to perform a given function or functions. Except where such substitution would not be operative, such substitution is within the intended scope of the embodiments.

The computing device 500 includes a processor 502 that can be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources can also include distributed computing devices, cloud computing resources, and virtual computing resources in general.

The computing device 500 also includes one or more memories 506, for example read-only memory (ROM), random access memory (RAM), cache memory associated with the processor 502, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 500 also includes storage media such as a storage device that can be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or BluRay disc, and so forth. Storage media such as flash drives, solid-state hard drives, redundant array of individual discs (RAID), virtual drives, networked drives and other memory means including storage media on the processor 502, or memories 506 are also contemplated as storage devices. It can be appreciated that such memory can be internal or external with respect to operation of the disclosed embodiments. It can be appreciated that certain portions of the processes described herein can be performed using instructions stored on a computer readable medium or media that direct computer system to perform the process steps. Non-transitory computable-readable media, as used herein, comprises all computer-readable media except for transitory, propagating signals.

Networking communication interfaces 508 can be configured to transmit to, or receive data from, other computing devices 500 across a network 512. The network and communication interfaces 508 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 508 can include wire data transmission links such as Ethernet and TCP/IP. The communication interfaces 508 can include wireless protocols for interfacing with private or public networks 512. For example, the network and communication interfaces 508 and protocols can include interfaces for communicating with private wireless networks such as Wi-Fi network, one of the IEEE 802.11x family of networks, or another suitable wireless network. The network and communication interfaces 508 can include interfaces and protocols for communicating with public wireless networks 508, using for example wireless protocols used by cellular network providers, including Code Division Multiple Access (CDMA) and Global System for Mobile Communications (GSM). A computing device 500 can use network and communication interfaces 508 to communicate with hardware modules such as a database or data store, or one or more servers or other networked computing resources. Data can be encrypted or protected from unauthorized access.

In various configurations, the computing device 500 can include a system bus 510 for interconnecting the various components of the computing device 500, or the computing device 700 can be integrated into one or more chips such as programmable logic device or application specific integrated circuit (ASIC). The system bus 510 can include a memory controller, a local bus, or a peripheral bus for supporting input and output devices 504, and communication interfaces 508. Example input and output devices 504 include keyboards, keypads, gesture or graphical input devices, motion input devices, touchscreen interfaces, one or more displays, audio units, voice recognition units, vibratory devices, computer mice, and any other suitable user interface.

The processor 502 and memory 506 can include nonvolatile memory for storing computable-readable instructions, data, data structures, program modules, code, microcode, and other software components for storing the computer-readable instructions in non-transitory computable-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

It is intended that the specification and examples be considered as exemplary only, with a true scope and spirit of the invention being indicated by the following claims.

What is claimed is:

1. A computer-implemented method comprising:
receiving, by a processor of a fraud detection engine, a request from a user device for an online service;
collecting, by the processor of the fraud detection engine, user validation credentials from the user device storing a payment vehicle and location data from a global positioning system (GPS) sensor associated with the user device, wherein the processor of the fraud detection engine automatically extracts the user validation credentials and the location data from the user device upon initiation of the request by the user device, and wherein the user validation credentials include at least one of authentication information of the user device and biometric information of a user;
storing, by the processor of the fraud detection engine, the user validation credentials and the location data in a storage device of the fraud detection engine, wherein the stored user validation credentials and the location data are encrypted;
determining, by the processor of the fraud detection engine, an interaction with between the user device storing the payment vehicle and a point-of-sale (POS) terminal, wherein the user device is registered with the POS terminal to initiate a check-out procedure for the user to complete the online service request at the POS terminal, and wherein a request for user data by the POS terminal during the check-out procedure is packaged into a data structure including an encoding format;
transmitting, by the POS terminal, the packaged data structure request to the fraud detection engine;
processing, by the processor of the fraud detection engine, the packaged data structure request to cause a generation of a first user interface element in a user interface of the user device and the POS terminal, wherein the first user interface element includes a notification to the user for transmitting the user data from the user device to the POS terminal, and wherein the user data is transmitted from the user device to the POS terminal via a near field communication (NFC) of the user device;

transmitting, by the POS terminal, the user data to the fraud detection engine;

decrypting, by the processor of the fraud detection engine, the encrypted user validation credentials stored in the storage device;

authenticating, by the processor of the fraud detection engine, the user data with the user validation credentials to determine a requirement for additional user data;

causing, by the processor of the fraud detection engine, a generation of a second user interface element in the user interface of the user device and the POS terminal, wherein the second user interface element includes a notification to the user to interact with the user device and approve release of the additional user data;

collecting, by the processor of the fraud detection engine, the additional user data;

comparing, by the processor of the fraud detection engine, the additional user data with the user validation credentials; and in response to the comparison, selectively:
  (i) authenticating, by the processor of the fraud detection engine, the online service upon determining a match,
  causing, by the processor of the fraud detection engine, a generation of a third user interface element in the user interface of the user device, wherein the third user interface element displays an authentication notification for the online service; and
  causing, by the processor of the fraud detection engine, a generation of a fourth user interface element in the user interface of the user device for rendering the online service, wherein the online service is a ride-sharing service, and wherein the user interface element indicates location of the user in-between a pick-up location and a drop-off location; or
  (ii) denying, by the processor of the fraud detection engine, the online service upon determining the additional user data is not a match with the user validation credentials, and
  causing, by the processor of the fraud detection engine, a generation of a fifth user interface element in the user interface of the user device, wherein the fifth user interface element displays a denial notification for the online service.

2. The method of claim 1, wherein the authentication information of the user device includes one of a mobile device phone number, make, model, and a MIC number.

3. The method of claim 2, wherein the user validation credentials includes at least one of a consumer's home address, work address, frequent travel destinations, security question and answers, favorite department store, and favorite dining establishment.

4. The method of claim 3, wherein the pick-up location and the drop-off location are compared with the home address and the work address in the user validation credentials.

5. The method of claim 1, wherein the POS terminal include an NFC system to wirelessly communicate with the user device storing the payment vehicle to obtain an authorization code or identifying information.

6. A system comprising:
a data storage device storing instructions; and
a processor of a fraud detection engine configured to execute the instructions to perform operations comprising:
  receiving, by the processor of the fraud detection engine, a request from a user device for an online service;
  collecting, by the processor of the fraud detection engine, user validation credentials from the user device storing a payment vehicle and location data from a global positioning system (GPS) sensor associated with the user device, wherein the processor of the fraud detection engine automatically extracts the user validation credentials and the location data from the user device upon initiation of the request by the user device, and wherein the user validation credentials include at least one of authentication information of the user device and biometric information of a user;
  storing, by the processor of the fraud detection engine, the user validation credentials and the location data in a storage device of the fraud detection engine, wherein the stored user validation credentials and the location data are encrypted;
  determining, by the processor of the fraud detection engine, an interaction between the user device storing the payment vehicle and a point-of-sale (POS) terminal, wherein the user device is registered with the POS terminal to initiate a check-out procedure for the user to complete the online service request at the POS terminal, and wherein a request for user data by the POS terminal during the check-out procedure is packaged into a data structure including an encoding format;
  transmitting, by the POS terminal, the packaged data structure request to the fraud detection engine;
  processing, by the processor of the fraud detection engine, the packaged data structure request to cause a generation of a first user interface element in a user interface of the user device and the POS terminal, wherein the first user interface element includes a notification to the user for transmitting the user data from the user device to the POS terminal, and wherein the user data is transmitted from the user device to the POS terminal via a near field communication (NFC) of the user device;
  transmitting, by the POS terminal, the user data to the fraud detection engine;
  decrypting, by the processor of the fraud detection engine, the encrypted user validation credentials stored in the storage device;
  authenticating, by the processor of the fraud detection engine, the user data with the user validation credentials to determine a requirement for additional user data;
  causing, by the processor of the fraud detection engine by, a generation of a second user interface element in the user interface of the user device and the POS terminal, wherein the second user interface element includes a notification to the user to interact with the user device and approve release of the additional user data;
  collecting, by the processor of the fraud detection engine, the additional user data;

comparing, by the processor of the fraud detection engine, the additional user data with the user validation credentials; and in response to the comparison, selectively:
  (i) authenticating, by the processor of the fraud detection engine, the online service upon determining a match;
  causing, by the processor of the fraud detection engine, a generation of a third user interface element in the user interface of the user device, wherein the third user interface element displays an authentication notification for the online service; and
  causing, by the processor of the fraud detection engine, a generation of a fourth user interface element in the user interface of the user device for rendering the online service, wherein the online service is a ride-sharing service, and wherein the user interface element indicates location of the user in-between a pick-up location and a drop-off location; or
  (ii) denying, by the processor of the fraud detection engine, the online service upon determining the additional user data is not a match with the user validation credentials, and
  causing, by the processor of the fraud detection engine, a generation of a fifth user interface element in the user interface of the user device, wherein the fifth user interface element displays a denial notification for the online service.

7. The system of claim 6, wherein the authentication information of the user device includes one of a mobile device phone number, make, model, and a MIC number.

8. The system of claim 7, wherein the user validation credentials includes one of a consumer's home address, work address, frequent travel destinations, security question and answers, favorite department store, and favorite dining establishment.

9. The system of claim 8, wherein the pick-up location and the drop-off location are compared with the home address and the work address in the user validation credentials.

10. The system of claim 6, wherein the POS terminal include an NFC system to wirelessly communicate with the user device storing the payment vehicle to obtain an authorization code or identifying information.

11. A non-transitory computer readable medium for use on at least one computer system containing computer-executable programming instructions for cause a processor of a fraud detection engine to perform operations comprising:

receiving, by a processor of the fraud detection engine, a request from a user device for an online service;

collecting, by the processor of the fraud detection engine, user validation credentials from the user device storing a payment vehicle and location data from a global positioning system (GPS) sensor associated with the user device, wherein the processor of the fraud detection engine automatically extracts the user validation credentials and the location data from the user device upon initiation of the request by the user device, and wherein the user validation credentials include at least one of authentication information of the user device and biometric information of a user;

storing, by the processor of the fraud detection engine, the user validation credentials and the location data in a storage device of the fraud detection engine, wherein the stored user validation credentials and the location data are encrypted;

determining, by the processor of the fraud detection engine, an interaction between the user device storing the payment vehicle and a point-of-sale (POS) terminal, wherein the user device is registered with the POS terminal to initiate a check-out procedure for the user to complete the online service request at the POS terminal, and wherein a request for user data by the POS terminal during the check-out procedure is packaged into a data structure including an encoding format;

transmitting, by the POS terminal, the packaged data structure request to the fraud detection engine;

processing, by the processor of the fraud detection engine, the packaged data structure request to cause a generation of a first user interface element in a user interface of the user device and the POS terminal, wherein the first user interface element includes a notification to the user for transmitting the user data from the user device to the POS terminal, and wherein the user data is transmitted from the user device to the POS terminal via a near field communication (NFC) of the user device;

transmitting, by the POS terminal, the user data to the fraud detection engine;

decrypting, by the processor of the fraud detection engine, the encrypted user validation credentials stored in the storage device;

authenticating, by the processor of the fraud detection engine, the user data with the user validation credentials to determine a requirement for additional user data;

causing, by the processor of the fraud detection engine, a generation of a second user interface element in the user interface of the user device and the POS terminal, wherein the second user interface element includes a notification to the user to interact with the user device and approve release of the additional user data transaction data;

collecting, by the processor of the fraud detection engine, the additional user data;

comparing, by the processor of the fraud detection engine, the additional user data with the user validation credentials; and in response to the comparison, selectively:
  (i) authenticating, by the processor of the fraud detection engine, the online service upon determining a match;
  causing, by the processor of the fraud detection engine, a generation of a third user interface element in the user interface of the user device, wherein the third user interface element displays an authentication notification for the online service; and
  causing, by the processor of the fraud detection engine, a generation of a fourth user interface element in the user interface of the user device for rendering the online service, wherein the online service is a ride-sharing service, and wherein the user interface element indicates location of the user in-between a pick-up location and a drop-off location; or
  (ii) denying, by the processor of the fraud detection engine, the online service upon determining the additional user data is not a match with the user validation credentials, and
  causing, by the processor of the fraud detection engine, a generation of a fifth user interface element in the user interface of the user device, wherein the fifth user interface element displays a denial notification for the online service.

12. The non-transitory computer readable medium of claim 11, wherein the authentication information of the user device includes one of a mobile device phone number, make, model, and a MIC number.

13. The non-transitory computer readable medium of claim 12, wherein the user validation credentials includes one of a consumer's home address, work address, frequent travel destinations, security question and answers, favorite department store, and favorite dining establishment.

14. The non-transitory computer readable medium of claim 13, wherein the pick-up location and the drop-off location are compared with the home address and the work address in the user validation credentials.

\* \* \* \* \*

UNITED STATES PATENT AND TRADEMARK OFFICE
CERTIFICATE OF CORRECTION

PATENT NO. : 11,983,715 B1
APPLICATION NO. : 15/695226
DATED : May 14, 2024
INVENTOR(S) : Moin Moinuddin Page 1 of 1

It is certified that error appears in the above-identified patent and that said Letters Patent is hereby corrected as shown below:

In the Claims

In Column 14, Line 55, after "interaction" delete "with"

In Column 15, Line 32, delete "match," and insert --match;--

In Column 16, Lines 59-60, delete "engine by," and insert --engine,--

In Column 18, Lines 36-37, delete "data transaction data;" and insert --data;--

Signed and Sealed this
Ninth Day of July, 2024

Katherine Kelly Vidal
*Director of the United States Patent and Trademark Office*